(12) United States Patent
Belliveau

(10) Patent No.: US 6,783,251 B1
(45) Date of Patent: Aug. 31, 2004

(54) IMAGE MODIFICATION EFFECTS FOR IMAGE PROJECTION LIGHTING DEVICES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 10/414,786

(22) Filed: Apr. 16, 2003

(51) Int. Cl.$^7$ .................. G03B 21/00; G03B 21/26; G03B 21/20; H05B 41/36; H04N 9/12
(52) U.S. Cl. .................. 353/122; 353/121; 353/94; 353/85; 315/291; 348/741
(58) Field of Search ................ 353/122, 121, 353/94, 85, 86; 315/291; 348/744, 771

(56) References Cited

U.S. PATENT DOCUMENTS

| | | | |
|---|---|---|---|
| 5,829,868 A | 11/1998 | Hutton | 362/276 |
| 6,057,958 A | 5/2000 | Hunt | 359/291 |
| 6,671,005 B1 * | 12/2003 | Pujol et al. | 348/771 |
| 2002/0070686 A1 * | 6/2002 | Hughes et al. | 315/291 |

OTHER PUBLICATIONS

Catalyst System Components, High End Systems, Inc. ©2003.
Catalyst Media in Motion.
[OPTI] 6" Effect Wheels.

* cited by examiner

Primary Examiner—Rodney Fuller
Assistant Examiner—Melissa J Koval
(74) Attorney, Agent, or Firm—Walter J. Tencza

(57) ABSTRACT

A stage lighting apparatus includes a lamp and a first light valve, which cooperate to project a first image and a second image wherein the second image is created by applying a function to a plurality of pixels of the first image. The plurality of pixels of the first image may be arranged in a straight line. Applying the function to the plurality of pixels of the first image may cause first, second, third, and fourth sets of the plurality of pixels to deviate from the straight line in first, second, third, and fourth directions, respectively. The first and third directions may be substantially the same, the second and fourth directions may be substantially the same, and the first direction may be substantially opposite the second direction

79 Claims, 9 Drawing Sheets

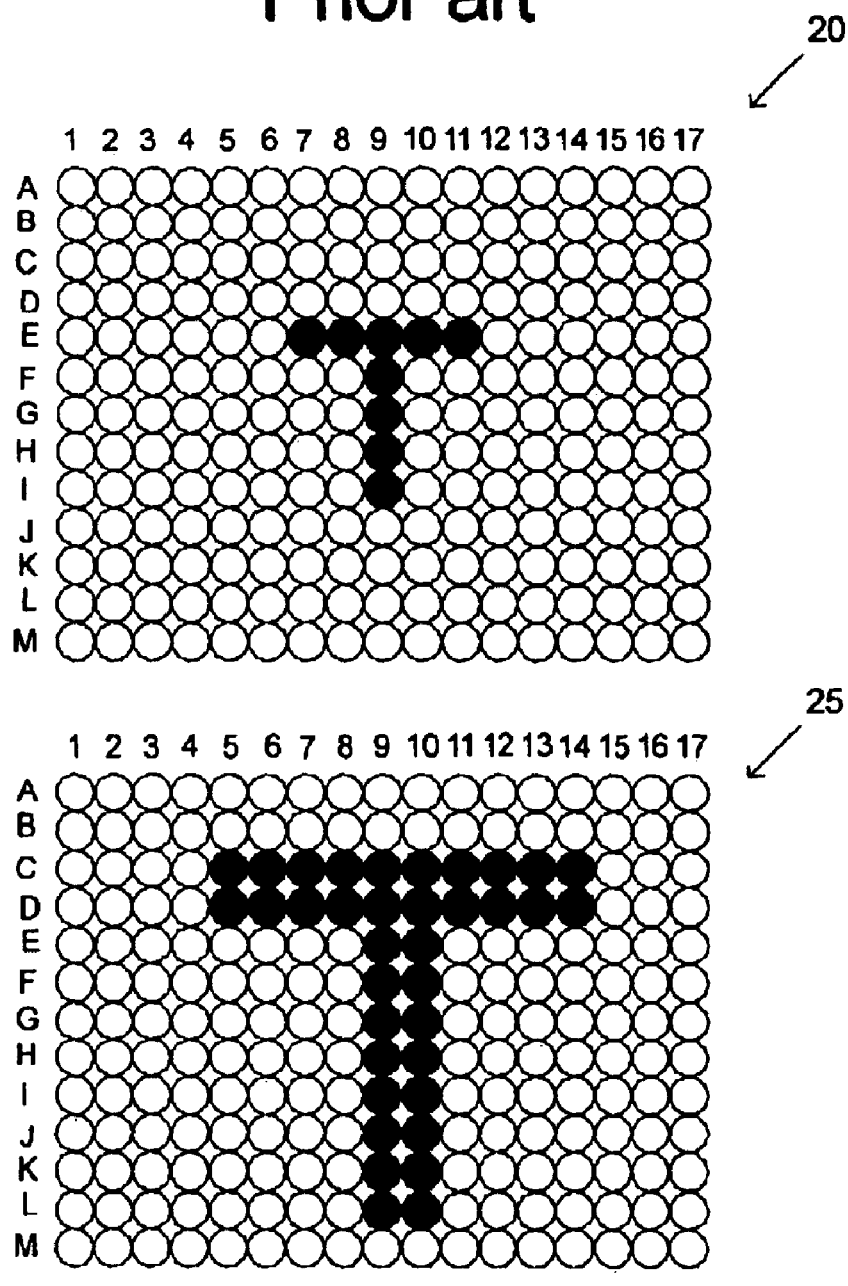
FIG 1
Prior art

IMAGE MODIFICATION EFFECTS FOR IMAGE PROJECTION LIGHTING DEVICES

FIELD OF THE INVENTION

This invention relates to image projection lighting devices.

BACKGROUND OF THE INVENTION

The embodiments of the present invention generally relate to lighting systems that are digitally controlled and to the lighting fixtures used therein, in particular multiparameter lighting fixtures having one or more image projection lighting parameters.

Lighting systems are typically formed by interconnecting, via a communications system, a plurality of lighting fixtures and providing for operator control of the plurality of lighting fixtures from a central controller. Such lighting systems may contain multiparameter lighting fixtures, which illustratively are lighting fixtures having two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multiparameter lighting devices are described in the product brochure entitled "The High End Systems Product Line 2001" and are available from High End Systems, Inc. of Austin, Tex.

A variety of different types of multiparameter lighting fixtures are available. One type of advanced multiparameter lighting fixture, which is referred to herein as an image projection lighting device ("IPLD"), uses a light valve or light valves to project images onto a stage or other projection surface. A light valve, which is also known as an image gate, is a device, such as a digital micro-mirror ("DMD") or a liquid crystal display ("LCD"), that forms the image that is to be projected. Other types of light valves that may also be used are liquid crystal on silicone (LCOS) or microelectromechanical systems (MEMs). The light valve's pixels are electronically controlled to form an image by setting the pixels of the light valve to transmit or block light from the lamp of the IPLD.

United States patent application titled "METHOD AND APPARATUS FOR CONTROLLING IMAGES WITH IMAGE PROJECTION LIGHTING DEVICES", inventor Richard S. Belliveau, Ser. No. 10/206,162, filed on Jul. 26, 2002, incorporated by reference herein, describes a central controller incorporating an image editor for use with a plurality of image projection lighting devices.

In their common application, IPLDs are used to project their images upon a stage or other projection surface. Control of the IPLDs is affected by an operator using a central controller that may be located several hundred feet away from the projection surface. In a given application, there may be hundreds of IPLDs used to illuminate the projection surface, with each IPLD having many parameters that may be adjusted to create a scene.

Programming a show on a central controller for a plurality of IPLDs can be very time consuming for an operator. For example a show using thirty or more IPLDs may be constructed by an operator of a central controller of a hundred or more scenes. A scene is programmed by adjusting the many parameters of each of the IPLDs. For each IPLD pan, tilt, selectable image, image rotate, zoom, focus, color and effects may each need to be adjusted.

U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or an image) created by a light valve like a video projection of sorts. A default gobo may have its characteristics modified by changing the characteristics of the matrix and hence, shifting that default gobo in different ways. The matrix operations, which are described, include scaling the gobo, rotation, iris, edge, strobe and dimmer. Hunt disclosees, "Other matrix operations are possible. Each of these matrix operations takes the default gobo and does something to it."

U.S. Pat. No. 5,829,868, issued Nov. 3, 1998 to Hutton, incorporated by reference herein, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

One example of a prior art image projection lighting device is the Catalyst (trademarked) system available from High End Systems, Inc. of Austin, Tex., and is described in the Catalyst (trademarked) system brochure incorporated herein by reference. The Catalyst (trademarked) image projection lighting device incorporates a video projector with a moveable mirror system that directs the images projected by the projector onto the stage or projection surface. A personal computer is used as a server that provides the images to the projector for projection onto the stage or projection surface. An operator of a central controller sends command signals over a communication system to the Catalyst (trademark) server to control the selection of images contained at the server. The selected image is then sent by the server to be projected by the video projector. An operator of the central controller may also control various effects that can be applied to the selected image. For example, the Catalyst (trademark) server may modify the selected image by electronically rotating the orientation of the image before sending the image to the projector to be projected upon the projection surface. Some examples of the types of modifications to the selected image are image rotate, negative image, image strobe, image zoom, RGB (red, green, blue) control and wobble. The different types of modifications of the selected image used to produce the final projected images can be referred to as "effects". An operator of the central controller can send effects commands to the Catalyst (trademarked) image server over the communication system to adjust or select the effects that modify the selected image to produce a final image that is projected onto the projection surface.

The images stored in the Catalyst (trademarked) sever are stored electronically in the memory of the server. When an image is selected by an operator of the central controller the central controller sends the appropriate command to the server to command the selected image to be projected by the video projector. The selected image at the server is mapped by a video graphics card and the pixel map can represent the state of the pixels of the light valves at the video projector and the projected image. The selected image applied to the pixel map can be varied by applying mathematical functions to the selected image. The mathematical functions can apply, for example offsets, inverts, and multiplication, to the selected image which results in the selected image being mapped to the pixel map in different ways. When a mathematical function is applied to the selected image to create an effect, a second image is created from the first selected image.

The first image may reside in the memory of the IPLD or the first image may be sent from a central controller over the communications system to be received by a communications port of the IPLD and then projected onto a projection surface. United States patent application titled "Method, apparatus and system for image projection lighting", inventor Richard S. Belliveau, publication no. 20020093296, Ser. No. 10/090926, filed on Mar. 4, 2002, incorporated by reference herein, describes communications systems that allow image content, such as in the form of digital data, to be transferred from a central controller to a plurality of IPLDs.

The effect that can be applied to the first image can form many different variations of the first image creating a second image. For example, the Catalyst (trademarked) server can apply a negative color effect to a first image that normally produces a white hexagonal image on a black background on the projection surface and the negative color effect applied will produce a black hexagonal image on a white background creating a second image from the first image. Since the first image is one of many images that are stored in the memory of the IPLD various effects applied to the first image are used to produce many image variations of the first image without the need to increase the memory capacity of the IPLD.

One effect used with prior art mechanical lights that do not comprise light valves is the liquid effect. A wheel of multicolored oils is imaged between a lamp and a focusing lens in a projector and rotated so that the oils create a liquid flowing motion that is projected onto a projection surface. One example of a liquid effect of the prior art is the Liquid Wheel (trademarked) manufactured by Optikinetics of Luton England.

Multicolored images projected by an IPLD of the prior art are usually comprised of three separate colored images. The three separate colored images are most often red, green and blue separate images.

The Catalyst (trademarked) image projection lighting device has the capability of modifying a first image by electronically zooming the first image. The operator of a central controller may enter a command into the central controller to apply a zoom effect to the first image that can be projected as a second image. The Catalyst (trademarked) server upon receiving the command applies the zoom effect to the first image. The first image is modified to be electronically zoomed by the Catalyst (trademarked) server as to cause an overall electronic magnification of the first image that creates a second image that can be projected onto the projection surface.

Another effect of the prior art that can be applied to a first image by the Catalyst (trademarked) server is a color gradient that alters the first image color by applying a color gradient to the first image to create a second image. It is also possible for an operator of the Catalyst system to choose a variable angular direction used to apply the color gradient to the first image. Varying the angular direction of a color gradient effect applied to the selected image is useful for varying the apparent color of the first image to create a second image however the first image proportions remain visibly unchanged in the second image as only the color of the image has been varied. The second image pixels remain mapped similarly as the fist image pixels except that the color intensity of the first image pixels has been varied by applying the color gradient. The Catalyst (trademark) server can also tile a first image so that a plurality several smaller images of the first image are created from the first image creating a tile effect. Each of the smaller image tiles of the second image remain the same color as the first image. If the color gradient effect is applied to the second image then the tiled images of the second image have their colors varied from a global standpoint since the gradient effect is not applied individually to the plurality of tiled images of the second image. When a color gradient effect is applied to the second tiled image the individual tiled images adjacent to each other can have substantially the same color. Since the gradient color effect is applied globally to the second image, the color gradient is not applied to each individual tiled image of the second image and the color gradient can bleed over the boundary of a tiled image resulting in a color outside of the line look. In the prior art it is also possible to superimpose a third additional colored image over the top of a tiled second image. The third color image can be called up from an image library in the server. The third colored image that can been superimposed onto the second tiled image can visually affect the color of the plurality of tiled images of the second image but the colors applied by superimposing the third colored image is again done globally not on individual tiles. The results can be disappointing as the third image color applied to the second image tiles can bleed over the boundary of a tile resulting in a color outside of the lines look.

SUMMARY OF THE INVENTION

In one or more embodiments of the present invention a stage lighting apparatus is comprised of a base, a yoke, and a lamp housing. The lamp housing is comprised of a lamp and a first light valve. The lamp and the first light valve cooperate to project a first image and a second image wherein the second image is created by applying a function to a plurality of pixels of the first image. The first image may be comprised of at least one straight line of pixels. Applying the function to the plurality of pixels of the first image may cause first, second, third, and fourth sets of the plurality of pixels of the first image to deviate from the straight line in first, second, third, and fourth directions, respectively. The second set of the plurality of pixels may be located in the second image between the first set and the third set. The third set of the plurality of pixels may be located in the second image between the second set and the fourth set. The first and third directions may be substantially the same, the second and fourth directions may be substantially the same, and the first direction may be substantially opposite the second direction. The function applied may be a waveform. The function applied may be a multiplication or a division. The lamp and the first light valve may cooperate to project a third image, wherein the third image is created by applying the function to one or more of the plurality of pixels of the second image. The function may be applied in a continuous manner to go from the first image to the second image to the third image.

In one or more embodiments a stage lighting apparatus may be further comprised of a control system. The function may be applied to a plurality of pixels of the first image by the control system. The stage lighting apparatus may be further comprised of a communications port. The communications port may receive a command to cause the function to be applied to the plurality of pixels of the first image. The control system may receive an input from a keypad to cause the function to be applied to the plurality of pixels of the first image. Applying the function to the plurality of pixels of the first image to create the second image may visually impart to an audience viewing the projected second image that the first image is flowing in liquid form.

In one or more embodiments a first image may be comprised of a plurality of separate colored image pixels and the function applied to the plurality of separate colored image pixels may deconverge the separate colored image pixels to create the second image. The function applied to the plurality of separate colored image pixels that make up the first image may be variable. The function may cause an amount of deconvergence of the plurality of separate colored image pixels of the first image, which amount can be varied.

In one or more embodiments the first image is comprised of a plurality of areas including a first area having a first set of the plurality of pixels, a second area having a second set of the plurality of pixels, a third area having a third set of the plurality of pixels; and one or more further areas having one or more further sets of the plurality of pixels. The second image may be comprised of a plurality of magnified areas including a first magnified area which is the first area of the first image magnified by a first magnification, a second magnified area which is the second area of the first image magnified by a second magnification, a third magnified area which is the third area of the first image magnified by a third magnification, and one or more further magnified areas which are one or more further areas, respectively, of the first image, magnified by one or more further magnifications, respectively. Any of the one or more further magnifications of any of the one or more further magnified areas which are adjacent to any of the first, second, or third magnified areas may be substantially different from the first, second, or third magnifications. In one or more embodiments none of the first, second or third magnified areas are adjacent to each other.

In one or more embodiments of the present invention an effect is applied to the first image that varies the proportions of the first image and the effect can be applied to the first image at different angles to create a second image and a third image while the first image is not rotated or is rotated asynchronous with the angle that the effect is applied.

In one or more embodiments of the present invention a tiling effect is applied to a first image to create a plurality of tiled images and a color varying function can vary the color of each of the tiled images to create a variably colored tiling effect. The tiling function can arrange the tiled images radially to create a kaleidoscope effect.

In one or more embodiments of the present invention a first image of a image projection lighting device is modified to create a liquid effect that is not mechanical and that is used to modify the first image and to create a second image with a liquid effect applied. In one or more embodiments of the present invention a liquid effect is disclosed that can be applied to the first image to create a second projected image that possesses a liquid effect.

In one or more embodiments of the present invention a deconverged effect is disclosed that deconverges a first image so that the separate colored images of the first image are no longer converged and produce a second image that possesses a deconverged effect.

BRIEF DESCRIPTION OF DRAWINGS

FIG. 1 shows a first prior art pixel mapped image not zoomed and a second prior art pixel mapped image that has been zoomed;

DETAILED DESCRIPTION OF THE DRAWINGS

Figure 2:
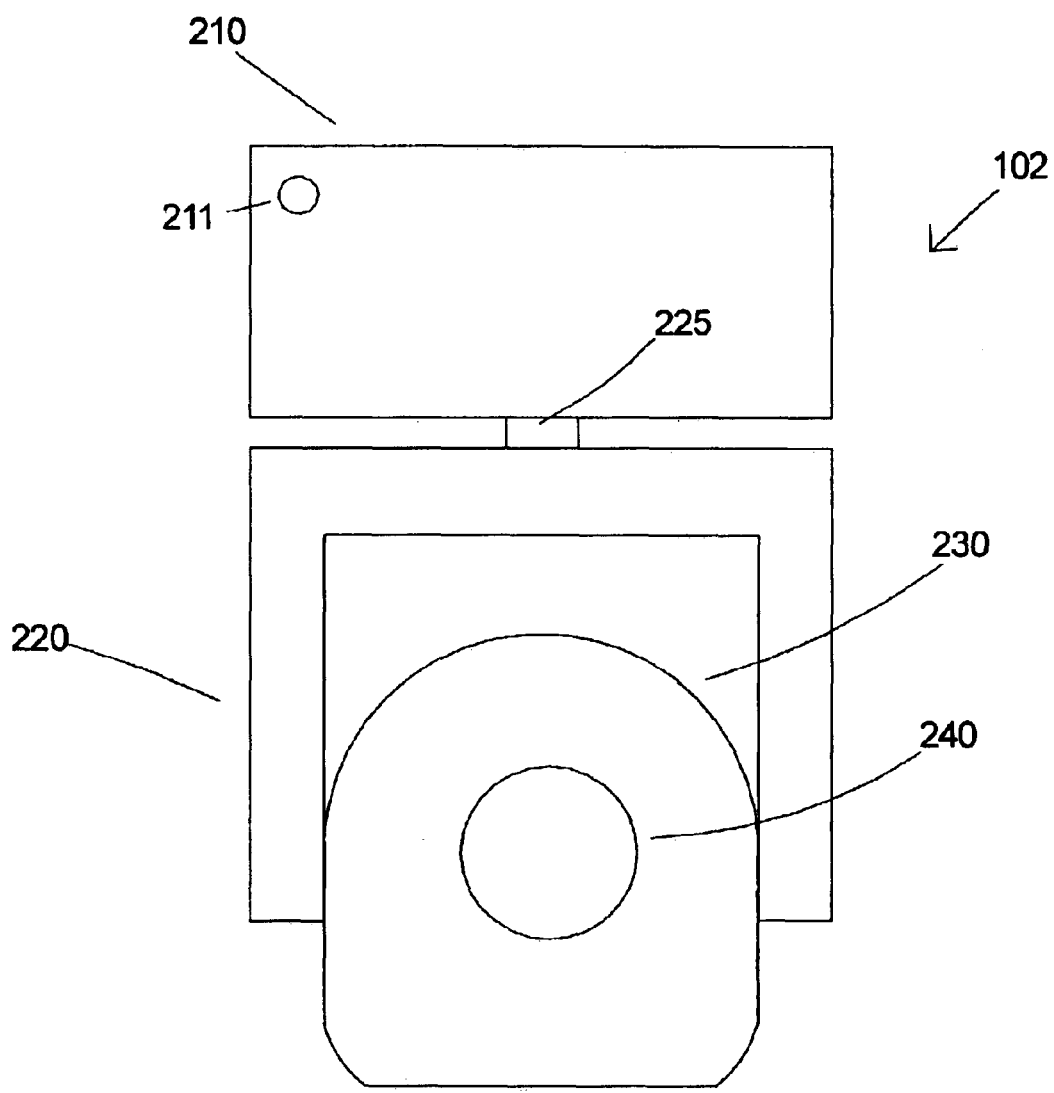
FIG. 2 shows an image projection lighting device in accordance with an embodiment of the present invention including a base housing and a lamp housing.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

FIG. 1 shows prior art pixel maps 20 and 25. The pixel maps 20 and 25 are graphical representations of electronic image data that can be used to form an image at a light valve or light valves of a prior art IPLD (image projection lighting device). The pixels of light valves of prior art IPLDs can be electronically controlled to transmit light (herein referred to as active pixels) or block light (herein referred to as inactive pixels). Active pixels of the pixel maps 20 and 25 are shown as solid black. A black pixel 18 in FIG. 1 is an example of an active pixel. Active pixels are pixels at that light valve that can project light from an IPLD. Inactive pixels of the pixel maps 20 and 25 are shown as outlined circles and an example of an inactive pixel is shown as 19. Inactive pixels are pixels at the light valve that do not project light from the IPLD. The pixel maps 20 and 25 can also represent how the images look when they are projected on a projection surface by prior art IPLDs.

The pixel maps of 20 and 25 are each comprised of thirteen rows of pixel positions labeled A–M and seventeen columns of pixel positions labeled 1–17. Although only two hundred and twenty-one (13×17) total pixel positions are shown for each of the pixel maps 20 and 25 (for simplification) pixel maps for IPLDs may contain millions of pixel positions.

The pixel map 20 shows a first image that has been pixel mapped comprised of active pixels in the seventh through eleventh columns of row E, and in the ninth columns of rows F, G, H, and I. The first image is an image of the letter "T". The image for the letter "T" includes both the active pixels and the inactive pixels show by pixel map 20. The pixel map 25 shows a second image that has been pixel mapped created by the first image comprised of active pixels in the fifth through fourteenth columns of rows C and D, and in the ninth and tenth columns of rows E through L. The second image displayed by the pixel map 25 is a zoomed image of the letter "T" shown by the pixel map 20. The pixel map 25 shows that a second image (the large "T") has been created by applying an overall zoom effect of the prior art to the first selected image (the smaller "T").

FIG. 2 shows a front view of an image projection lighting device 102 incorporating the image modification effects of an embodiment of the present invention. The IPLD 102 includes a base or electronics housing 210, a yoke 220, and a lamp housing 230. The IPLDs 102 and 104 of FIG. 4 may each be identical to the IPLD 102 of FIG. 2.

Figure 3:
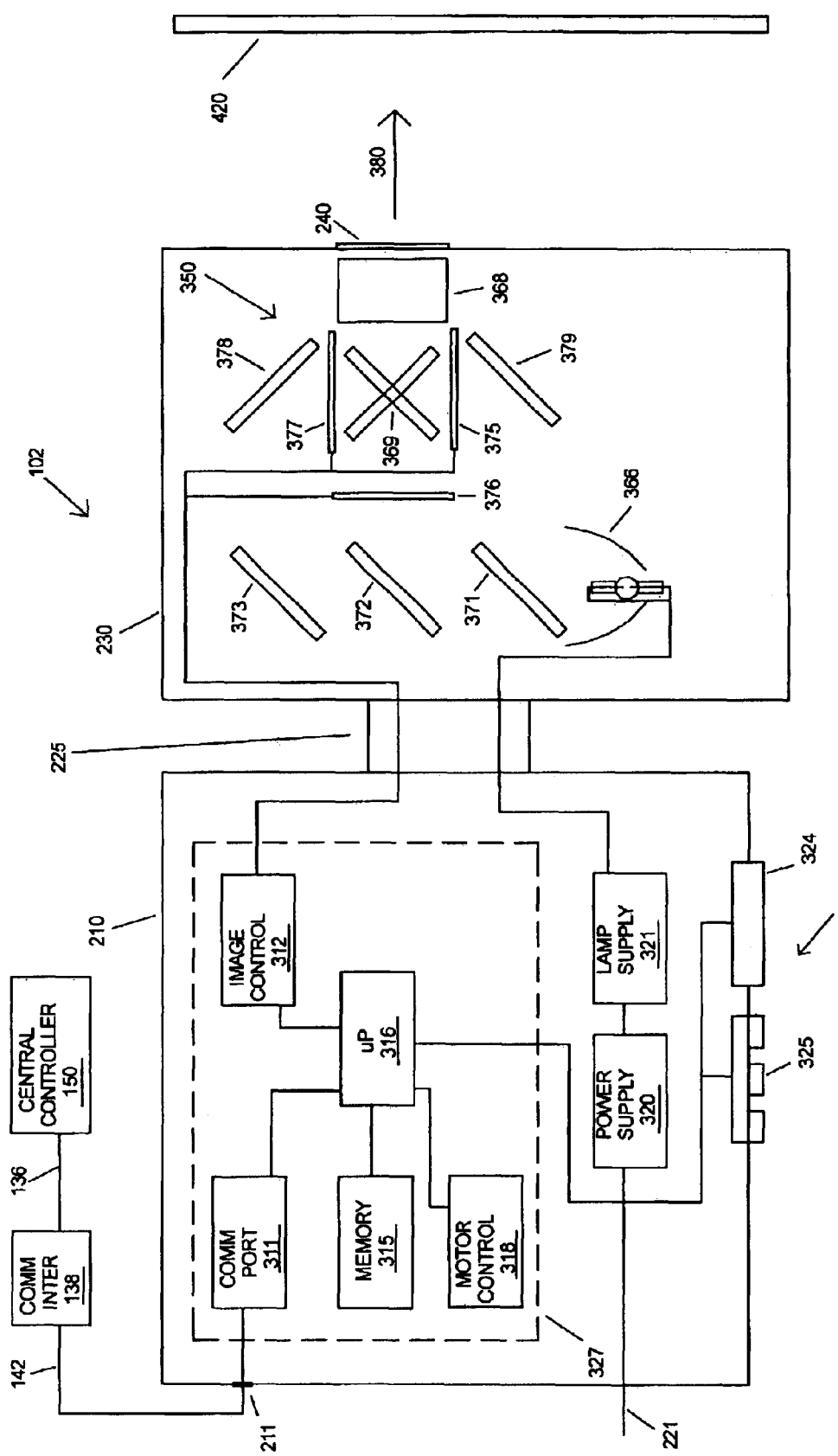
FIG. 3 shows a block diagram of components within a base housing and the lamp housing of the image projection lighting device of FIG. 2.
Figure 4:
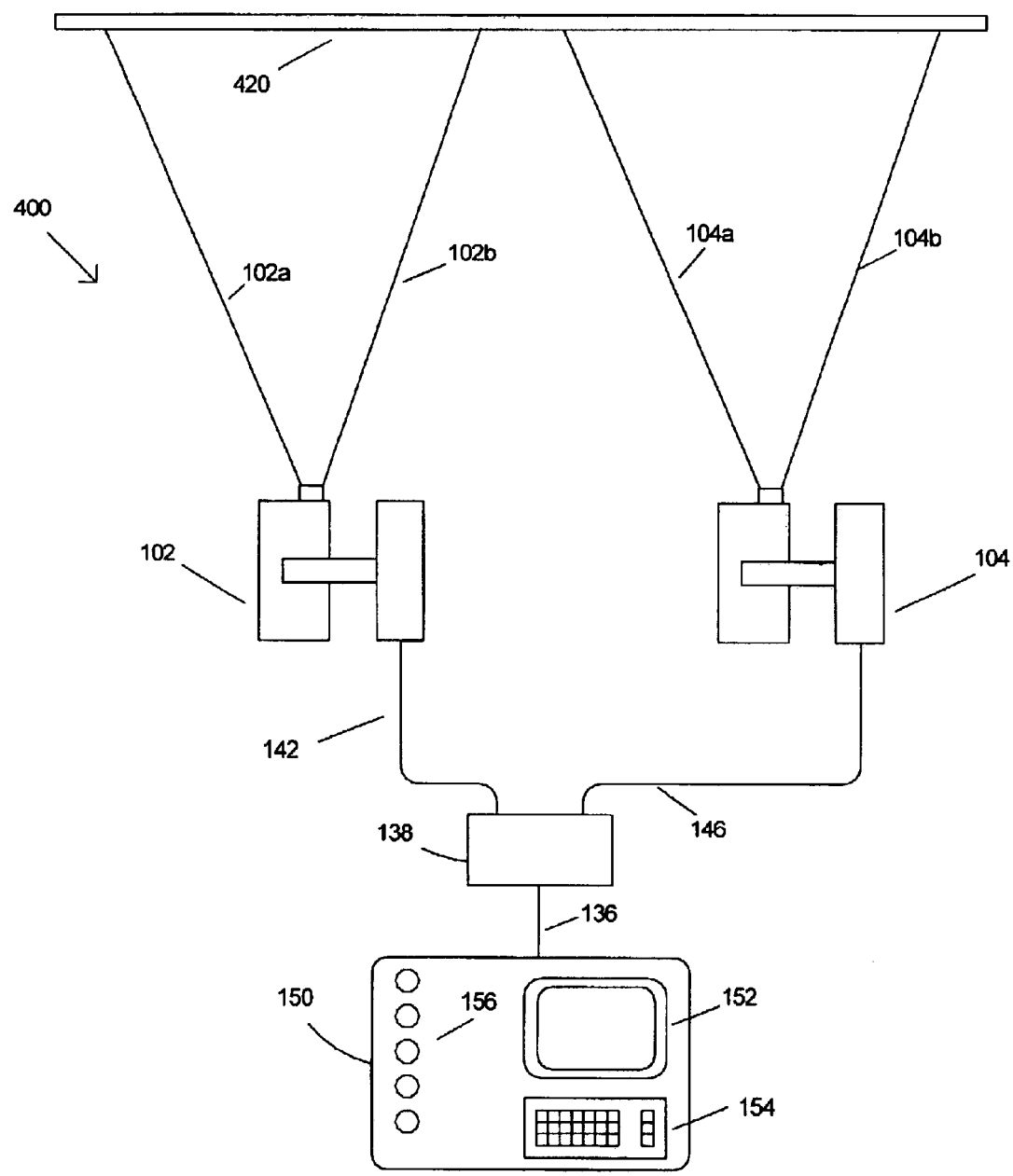
FIG. 4 shows a lighting system in accordance with an embodiment of the present invention.

The base housing 210 of the IPLD 102 includes a communications connection 211 for electrically connecting a communications line, such as communications line 142 shown in FIG. 4. The yoke 220 is physically connected to the housing 210 by a bearing 225, which allows the yoke 220 to pan or rotate in relation to the base or electronics housing 210. The lamp housing 230 is rotatably connected to the yoke 220 (bearings not shown for simplification). The lamp housing 230 typically contains optical components and light valves. An exit aperture 240 is shown for projecting lighted images from a projection lamp, such as a lamp 366 shown in FIG. 3. The projection lamp 366 shown in FIG. 3 is shown as a single lamp but it is known in the art to use two or more projection lamps working as a single projection lamp. IPLD 102 is shown with a separate base housing 210 and lamp housing 230, however it is known in the art to produce an IPLD with a single housing using a mirror to position the projected light.

FIG. 3 is a block diagram showing components within or part of the base housing 210 and within or part of the lamp housing 230 of the IPLD 102. FIG. 3 also shows the central controller 150. An electronic control system 327 can be contained in the base housing 210. The electronic control system 327 is comprised of at least a processing system such as processor 316. The processor 316 may be made up of discrete electronic parts or the processor 316 may be made up of several processors. The components within or part of the base housing 210 includes a communications port (shown as "comm port") 311, connection point 211, image control 312, memory 315, microprocessor or processor 316, motor control 318, motor power supply 320 and lamp power supply 321. A bearing 225 is shown rotatably connecting the lamp housing 230 to the base housing 210, in FIG. 3, and although only one bearing is shown for simplification more than one bearing may rotatably connect the lamp housing 230 to the base housing 210. A display device 324 is also shown within or connected to the base housing 210. The display device 324 may be a display for alphanumeric characters or a video display capable of displaying video images. An input keypad 325 is also shown within or connected to the base housing 210. The input keypad 325 together with the display device 324 can be called a stand alone control system 326. The stand alone control system 326 can be used to enter data and to control the parameters of the IPLD 102.

The components within or part of the lamp housing 230 include the lamp 366 that projects a white light to a red color separation system filter 371. The color separation filter 371 reflects red light from the white light created by the lamp 366 to a reflecting mirror 379 where it is directed to a red light valve 375 and imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The order of the color separation filters may be different. Color combining system 369 combines the imaged red, green and blue light that has been imaged by the red, green and blue light valves 375, 376 and 377 respectively and passes the multicolored lighted images to a zoom and focus lens 368 where it is directed through the aperture 240 in the direction of arrow 380 to the projection surface 420. The red, blue and green light valves 375, 376 and 377 respectively, are controlled to produce images by the image control 312. The image control 312 can be a video graphics card with a memory and a graphics processor.

The central controller 150 outputs address and control commands over a communications system which may include communications interface 138. The communications interface 138 is connected to the communications port 311 by communications line 142 and connection point 211 as shown in FIG. 3. The communications port 311 may be a part of the processor 316, the communications port 311 can be any device capable of receiving the communication sent over the communications system. The communications interface 138 may be a router or hub as known in the communications art. The communications interface 138 may not be required for some communications systems.

The image control 312 of the electronics housing 210 provides control signals to the light valves 375, 376, and 377 in the lamp housing 230. The microprocessor 316 in the electronics housing 210 provides control signals to the image control 312. The microprocessor 316 is shown electrically connected to the memory 315. The memory 315 stores the software operating system for the IPLD 102 and possibly different types of electronic image content used to form pixel mapped images at the image control 312. An electronic image that can be stored in the memory 315 is comprised of pixels represented by pixel data. The term pixel map is a general term that describes the processing of an image in preparation for supplying control signals to the light valves. The pixel mapped images are used by the image control to provide the control signals to the light valves 375, 376 and 377. The light valves shown as 375, 376 and 377 are shown as transmissive type light valves where light from the projection lamp 366 is directed to the light valves to be transmitted through the light valves 375, 376 and 377 to the lens 368. As known in the prior art a light valve can be a reflective light valve where light from the projection lamp 366 is directed to the light valves 375, 376 and 377 to be reflected from the light valves 375, 376, and 377 to the lens 368.

The motor control 318 is electrically connected to motors. The electrical connection to the motors is not shown for simplification. The motors may be stepping motors, servomotors, solenoids or any other type of actuators. The motor control 318 provides the driving signals to the motors that may be used with the lens 368 and for pan and tilt motors (not shown for simplification).

The motor control 318 is electrically connected to receive control signals from the microprocessor 316. Two power supplies are shown in FIG. 3. A motor power supply 320 is shown for supplying energy to the motors and may also supply power to the electronic components. A lamp power supply 321 is shown for supplying power to the main projection light source or lamp 366.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 420 from the lens 368 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

FIG. 4 shows a lighting system 400 that includes IPLDs 102 and 104. Although only two IPLDs are shown for the lighting system 400 as many as one hundred or more IPLDs can be used to create a show. The central controller 150 has a keyboard entry device 154 and input devices 156 to allow an operator to input commands for controlling the IPLDs 102 and 104. The central controller 150 has a visual display monitor 152 so the operator can see the details of the show that the operator programs on the central controller 150.

The commands entered by the operator of the central controller 150 are sent over a communications system using communications lines 136, 142, 146 and communications interface 138 to the IPLDs 102 and 104 of FIG. 4. Each IPLD has an operating address that is different than the operating address of other IPLDs so that the operator can command a specific IPLD from a plurality of IPLDs. The operating address of the IPLD can be stored in the memory 315 or stored as a function of the input keypad 325. The desired operating address of the IPLD the operator wishes to control is input into the central controller 150 by inputting to the keyboard 154 or other input device of the central controller 150. The desired operating address is sent over the communication system by the central controller 150 where it is received by the plurality of IPLDs 102 and 104. A receiving IPLD such as IPLD 102 receives the desired operating address at the communications port 311 of FIG. 3. The received operating address is compared with the operating address stored in the memory 315 of FIG. 2 and if the received operating address matches the operating address stored in the memory 315, of IPLD 102, for example, then next the IPLD 102 is ready to receive commands from the central controller 150. Once the desired IPLD has been addressed by the operator of the central controller 150 the operator may next send commands to select a first image or vary the other parameters of the addressed IPLD. The images that are selected by the operator that can be projected by the IPLD 102 can originate from the central controller 150 or the content may originate from the memory 315 of FIG. 3.

The operator of the central controller 150 can send a command to the IPLD 102 to project a first image. The processor 316 receives the command from the central controller 150 as received by the communications port 311 for the IPLD to project a first image. The memory 315 may contain many files of images. Files of images may be referred to as content. The processor 316 upon receiving the command to project a first image may transfer the first image from the memory 315 to the image control 312. The image control 312 maps out the plurality of pixels of the first image so that the proper image signals can be sent from the image control 312 to the light valves 375, 376 and 377. The image control 312 converts the first image by mapping the first image so that it can correctly be imaged by the light valves 375, 376, and 377. If the first image data is multicolored then mapping is done for the separate images of red, blue and green are sent as image signals to the light valves 375, 376 and 377 respectively. The pixels that make up each of the light valves 375, 376 and 377 respond to the image signals of red, blue and green respectively by transmitting or blocking light from the lamp 366 corresponding to the image signals. The three separate images of red, green and blue as created by the pixels of the light valves 375, 376 and 377, respectively, are then combined by the combining system 369 and imaged by the lens 368. The lens 368 projects the combined lighted images to be sent through the aperture 240 in the direction of arrow 380 to be projected upon the projection surface 420, as a multicolored image.

The image control 312 may also modify the first image when an effects command is sent from the central controller 150 over the communications system to be received by the communications port 311 of IPLD 102. The communications port 311 forwards the effects command to the processor 316 where it is operated upon in accordance with the operating system stored in the memory 315. The processor 316 sends control signals to the image control 312 to apply the desired effect to the first image. The effect is applied to the first image by the image control by implementing a mathematical function to the plurality of pixels of the first image.

Figure 5:
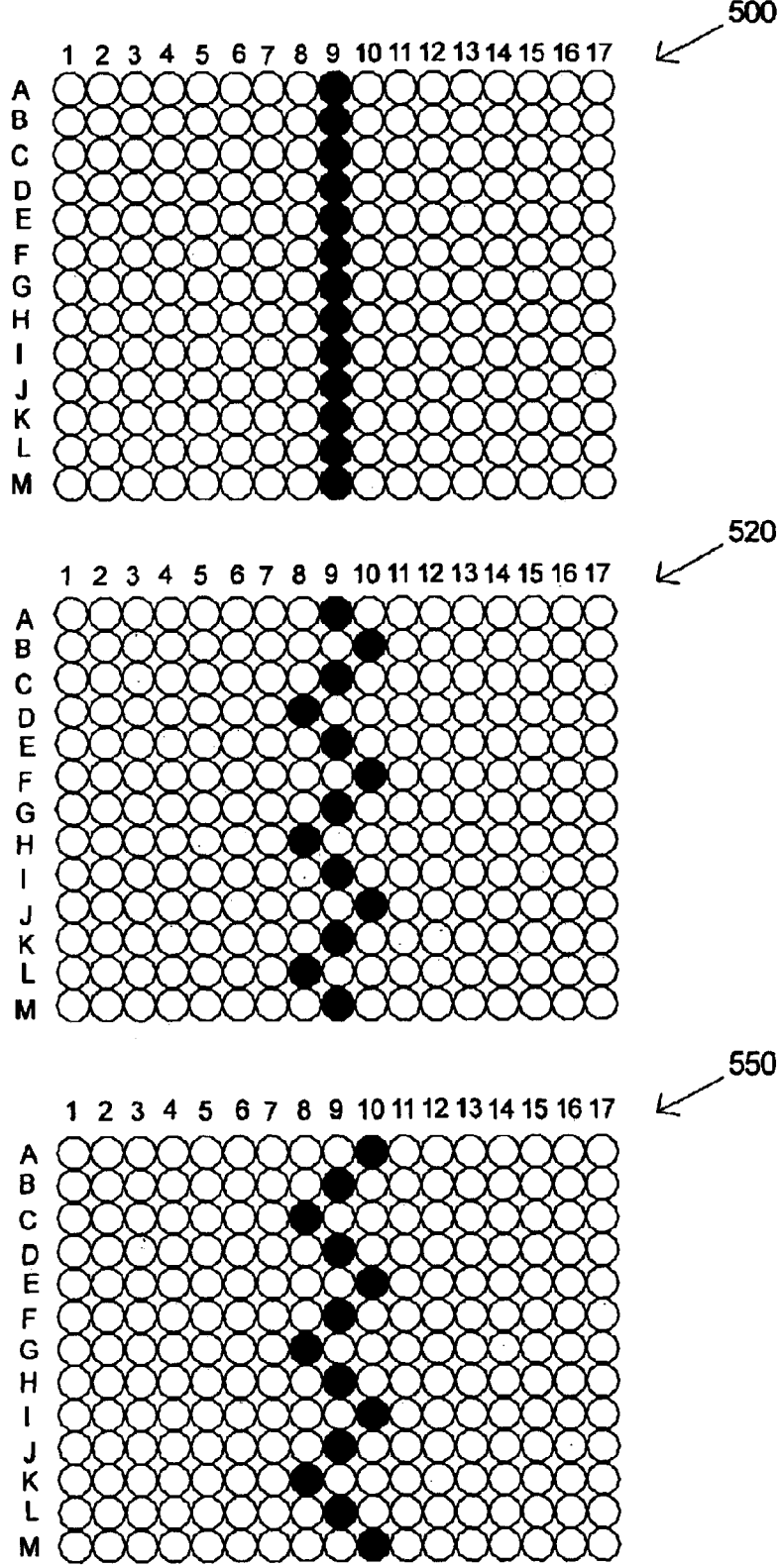
FIG. 5 shows a first pixel mapped image of a first image; a second pixel mapped image of a second image created by modifying a plurality of pixels of the first image and a third pixel mapped image of a third image created by modifying a plurality of pixels of the second image in accordance with an embodiment of the present invention.
Figure 6:
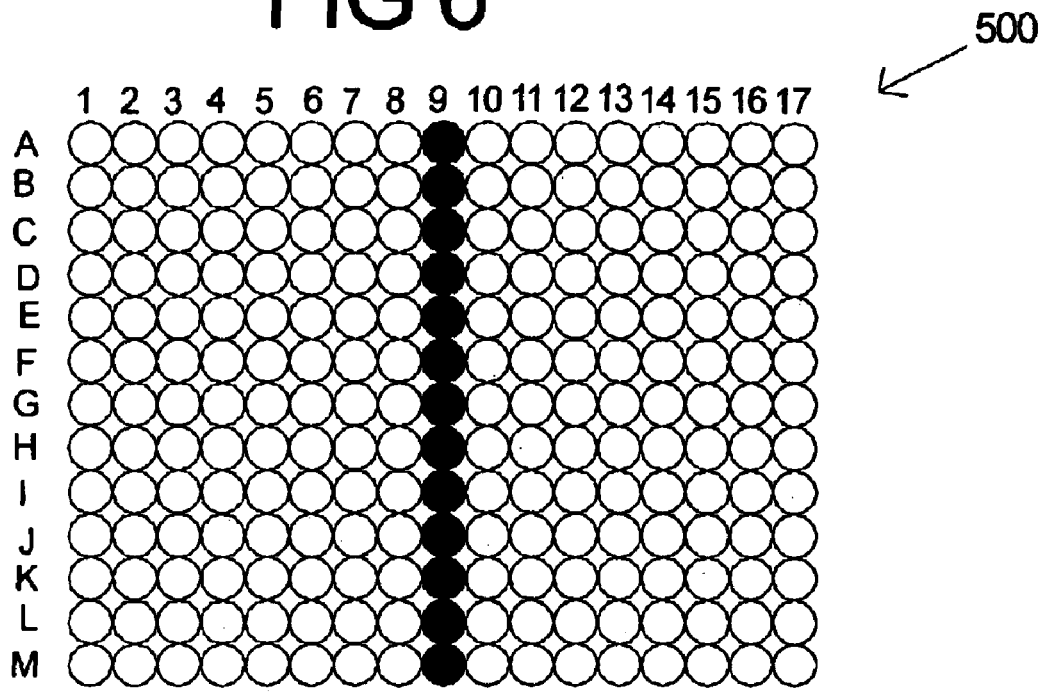
FIG. 6 shows the first pixel mapped image of the first image of FIG. 5 and a second pixel mapped image of a second image created by modifying the first image pixels in accordance with an embodiment of the present invention.
Figure 6:
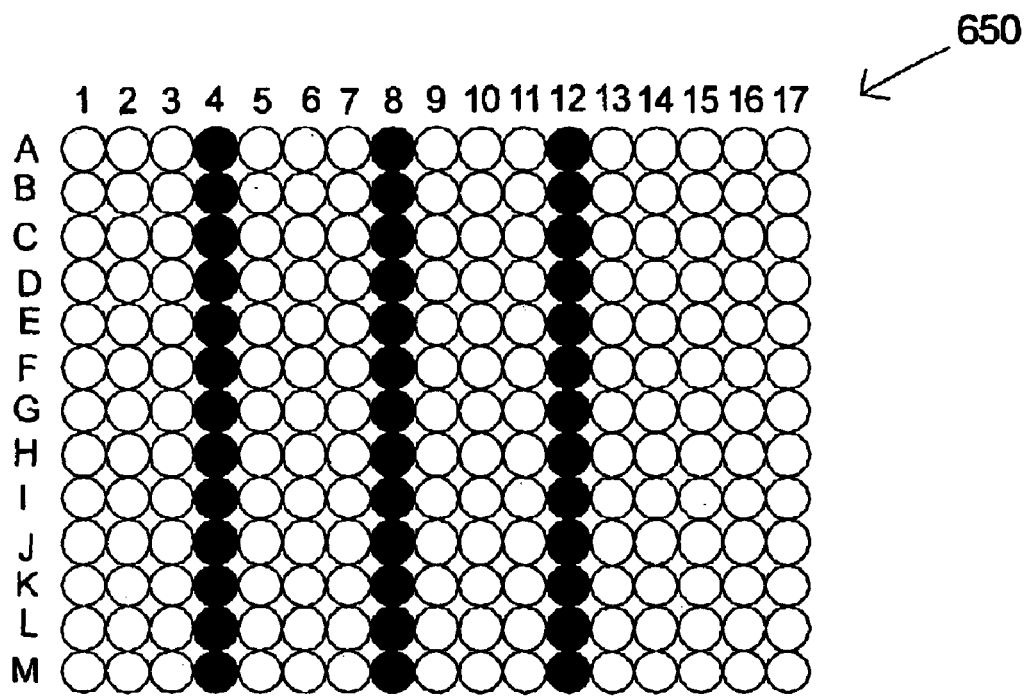
Figure 7:
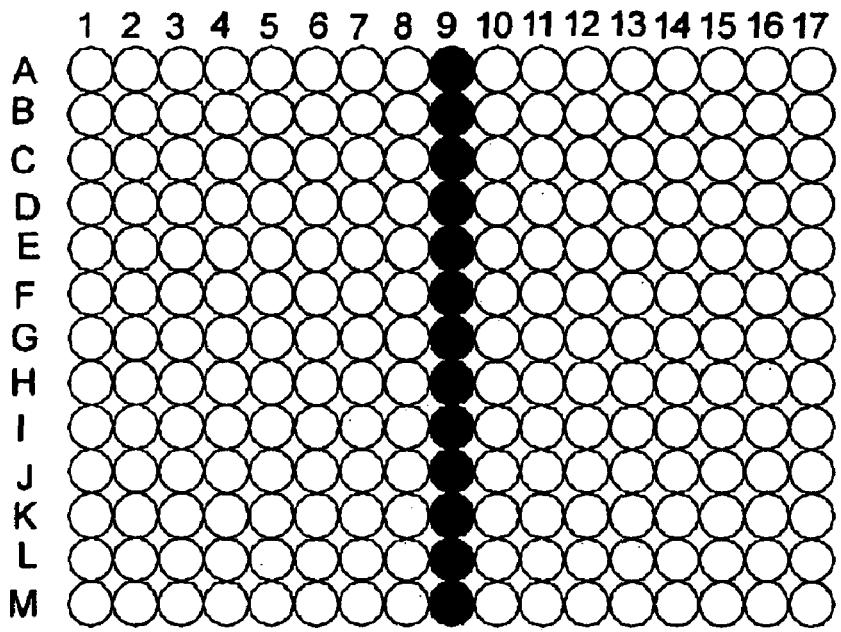
FIG. 7 shows a first pixel mapped image of the first image of FIG. 5 and a second pixel mapped image of a second image created by modifying the first image pixels in accordance with an embodiment of the present invention.
Figure 7:
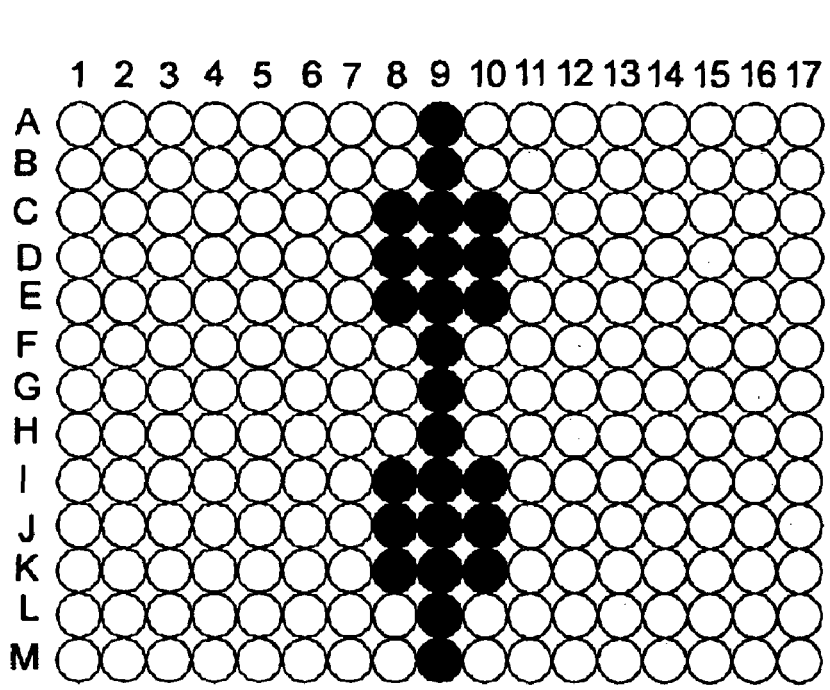
Figure 8:
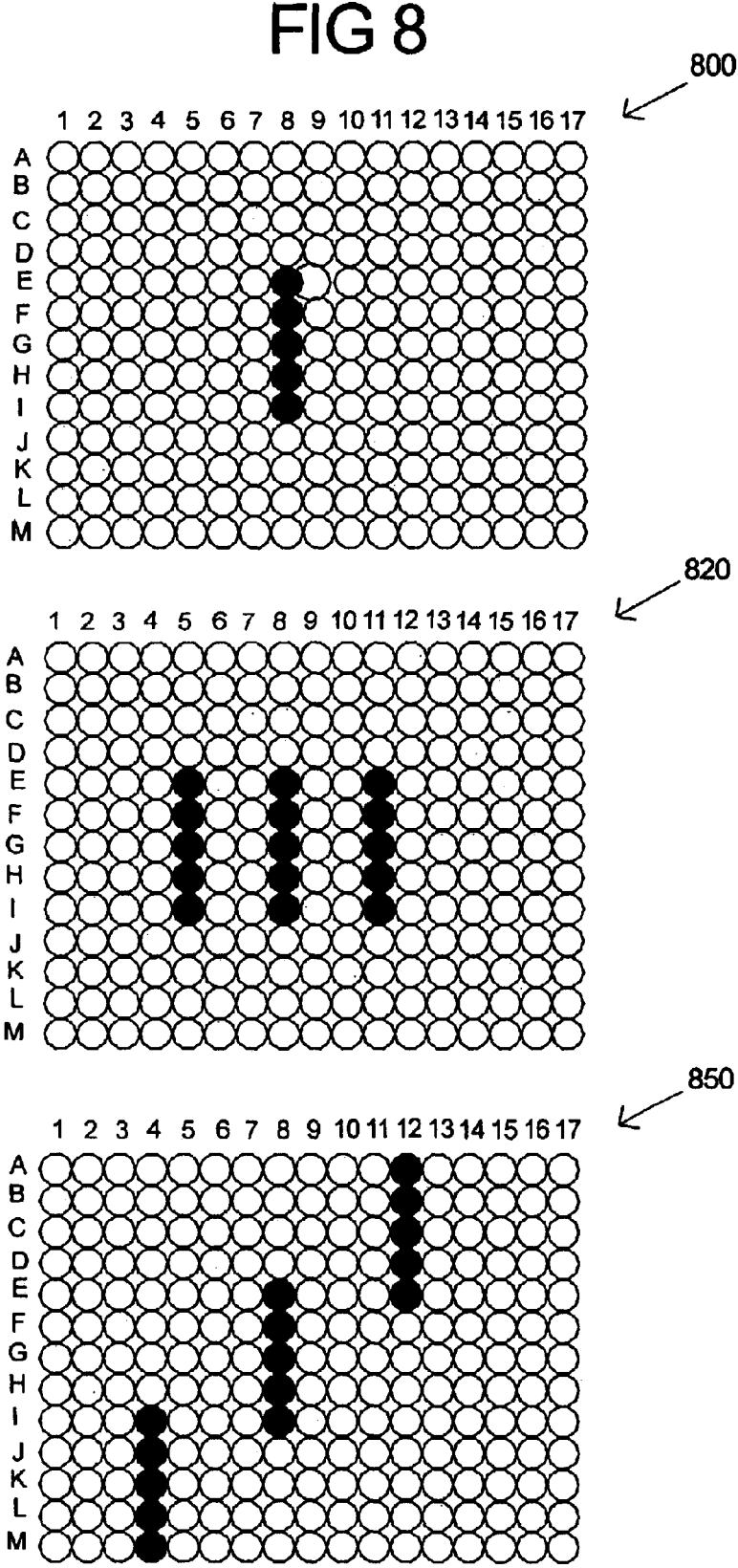
FIG. 8 shows a first pixel mapped image of a first image, a second pixel mapped image of a second image created by modifying a plurality of pixels of first image pixels, and a third pixel mapped image of a third image created by modifying a plurality of pixels of the second image in FIG. 8 in accordance with an embodiment of the present invention.
Figure 9:
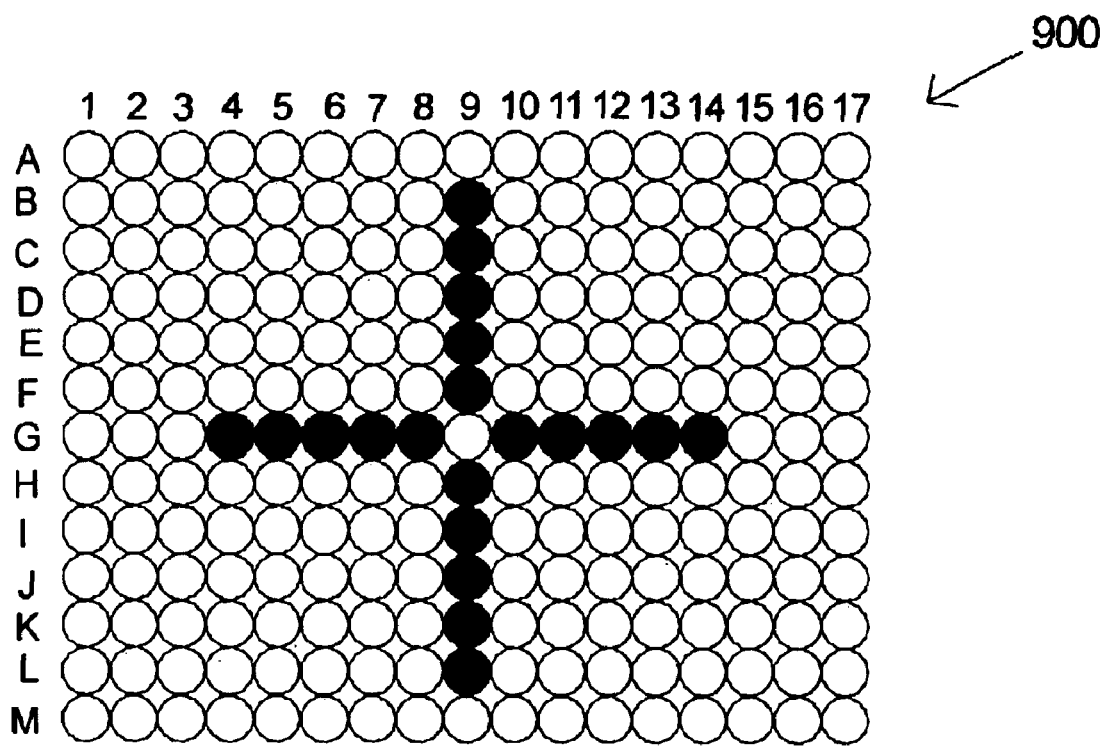
FIG. 9 shows a first pixel mapped image of a fourth image where a tiling effect has been applied radially to the first pixel mapped image of FIG. 8.

FIG. 5 shows pixel maps 500, 520, and 550. FIG. 6 shows pixel maps 500 and 650. FIG. 7 shows pixel maps 500 and 750. FIG. 8 shows pixel maps 800, 820, and 850. FIG. 9 shows pixel map 900. Each of the pixel maps 500, 520, 550, 650, 750, 800, 820, 850 and 900 are comprised of thirteen rows of pixel positions labeled A–M and seventeen columns of pixel positions labeled 1–17. Although only two hundred and twenty-one (13×17) total pixel positions are shown for simplification, pixel maps for IPLDs may show millions of pixel positions. The pixels located on a pixel map (such as pixel map 500) form many straight lines at different angles. The pixels arranged in row A can be considered to be arranged in a horizontal straight line. The pixels in column one can be considered to be arranged in a vertical straight line. Pixels at locations M1, L2, K3, J4, I5, H6, G7, F8, E9, D10, C11, B12, and A13 form a plurality of pixels that are arranged on a straight line at a forty five degree angle. The pixels located on a pixel map (such as pixel map 500) are comprised of many areas. For example the pixel at location A1 is a single pixel area. Pixels at locations K14, K15, L14, L15 located on a pixel map (such as pixel map 500) form an area of a plurality of pixels.

An example of an active pixel shown as a black pixel 18 in FIG. 1. Active pixels are pixels that are projecting light from the IPLD 102, in this example white light. i.e. the pixels which are shown as black are actually projecting white light. Inactive pixels are shown as outlined clear or white circles and an example of an inactive pixel is shown as circle 19 of FIG. 1. Inactive pixels are pixels at the light valve that do not project light from the IPLD. The pixel maps 500, 520, 550, 650, 750, 800, 820, 850 and 900 can also represent how the images look when they are projected on a projection surface 420 by an IPLD of the invention, except for the fact that active pixels (which are shown as black) would show white light while inactive pixels (which are shown as clear circles) would be dark, having no light.

FIG. 5 shows the pixel map 500 which shows a first image that has been pixel mapped. The first image includes both the active and inactive pixels of the pixel map 500. The first image shown by the pixel map 500 is a straight line of active pixels and a plurality of inactive pixels. The straight line of active pixels has been mapped in the ninth column of all of the rows. The first image although seen as a black straight line (along with white circles for inactive pixels) in FIG. 5, may actually be a white straight line (along with dark, not lit areas) image. The white straight line example is used for simplification however the first image can be any image that can be projected by the IPLD 102. A white straight line can be considered a multicolored image since a white straight line image is comprised of the multicolored pixels that comprise the separate colored images of the separate colors of red, green and blue.

FIG. 5 shows the pixel map 520 which shows a second pixel mapped image that was created from the first image as shown by pixel map 500. The second image is created from the first image when a waveform to create a liquid effect is applied to the first image pixels moving the first image pixels from their placement on the pixel map 500 to their new positions on the pixel map 520. A liquid effect applied to a first image modifies the first image so that a second image is created that visually imparts to the audience viewing the projected second image that the first image is in flowing liquid form. The second image is shown by the active pixels which are at locations A9, B10, C9, D8, E9, F10, G9, HB, I9, J10, K9, L8, and M9 as pixel mapped by pixel map 520. The liquid effect of the second image was produced from the first image by the image control 312 by applying a sinusoidal waveform function to the pixels that make up the first image as shown in the pixel map 500. The sinusoidal waveform function applied to the first image pixels alters the way the first image pixels are arranged to produce the second image as shown on the pixel map 520. The sinusoidal function applied to the first image pixels was applied down the rows A, B, C, D, E, F, G, H, I, J, K, L and M resulting in the creation of the second image as shown pixel mapped by pixel map 520. Other waveform functions can be applied to the first image pixels to create the liquid effect such as triangular wave and square wave, however a sinusoidal waveform best duplicates the effect of a flowing liquid and is preferred. The mathematical function applied to the first image pixels as mapped by pixel map 500 to create the liquid effect can be applied in an orientation down the rows A, B, C, D, E, F, G, H, I, J, K, L and M or across the columns 1, 2, 3, 4, 5, 6, 7, 8, 9, 10, 11, 12, 13, 14, 15, 16, and 17. The waveform function can also be applied to the first image pixels in any orientation so that second image pixel map of the first image pixels can take many forms.

The active pixel formerly at location B9 in pixel map 500 has been moved in a first direction to location B10 in pixel map 520. The active pixel formerly at location D9 in pixel map 500 has been moved in a second direction to location D8 in pixel map 520. The active pixel formerly at location F9 in pixel map 530 has been moved in a third direction to location F10 in pixel map 520. The active pixel formerly at location H9 in pixel map 500 has been moved in a fourth direction to location H8 in pixel map 520. The first direction and the third direction are the same. The second direction and the fourth direction are the same. The first direction is opposite the second direction. The third direction is opposite the fourth direction. The pixels which have been moved from the pixel map 500 to the pixel map 520 have been misaligned, moved, or have been deviated from the straight line of active pixels shown in column 9 of pixel map 500. Although the pixel map 529 shows a liquid effect where single pixels deviate from the straight line with the sinusoidal function for simplification, multiple pixels in sets may deviate from the straight line.

Pixel map 550 shows a third image that has been created by relocating the pixels of the second image as shown by pixel map 520. Pixel map 550 that shows the third image is designed to show that a waveform function applied to the first image pixels can progressively modify the first image to a second image and then to a third image with proportions that are visibly different than the first image. I.e. the waveform function can be applied to the first image to obtain the second image and then can be applied to the second image to obtain the third image or can continuously be applied to eventually go from the first image to the third image. The first image pixels that have been relocated to the third image pixel map 550 have been located out of phase with the location of the pixels of the second image pixels shown by pixel map 520 by continually applying the waveform function. The second image as shown mapped by pixel map 520 and the third image as shown mapped by pixel map 550 were created by varying the proportions of the first image as shown mapped by pixel map 500 by applying a function that creates the liquid effect of the first image. Preferably the waveform function used to create the liquid effect is a continuously running waveform and the application of the waveform to the first image continuously applies its effect to create continuous variants of the proportions of the first image such as those shown by the pixel map 520 of the second image and the pixel map 550 of the third image. The waveform function that applies an effect to the first image can be stored as software in the memory 315, in a memory that may be contained at the image control 312 or the waveform function can be generated by electronic hardware components as known in the art. The control of the amplitude and frequency of the waveform function can be made to be variable. The amplitude and frequency of the waveform can be made variable in response to a random number generator so that the amplitude and or frequency are varied randomly. The central controller 150 may send commands over the communication system to the IPLD 102 to be received by the communication port 311 that command changes in the amplitude or frequency of the waveform function and thus alter the first image in many different ways suitable to the operator.

FIG. 6 shows the same pixel map 500 that shows the first pixel mapped image as shown in FIG. 5. Again the first image created by the first image pixels is a straight line as shown by the active pixels for the entire ninth column along with inactive pixels in the other columns. The first image is a vertical white straight line image (although shown as a black line of active pixels in FIG. 6,) for simplification however the first image can be any image that can be projected by the IPLD 102. A white straight line can be considered a multicolored image since a white straight line image is comprised of the multicolored pixels that comprise the separate colored images of the separate colors of red, green and blue.

Pixel map 650 shows how the first image pixels have been relocated onto the pixel map 650 by a function that has been applied to the first image pixels to cause the plurality of separate colored image pixels that make up the first image pixels of the white line image shown in pixel map 500 to deconverge into a first, second and third separate colored images of red, green and blue respectively. The red first separate image as shown mapped by the second image pixel map 650 is a component of the first image pixels mapped by the pixel map 500 and is shown as a line formed by active pixels at locations of the fourth column of the pixel map 650. The green second separate image as shown mapped by the second image pixel map 650 is a component of the first image active pixels mapped by the pixel map 500 and is shown as a straight line formed by active pixel at locations of the eighth column of the pixel map 650. The blue third separate image as shown mapped by the second image pixel map 650 is a component of the first image active pixels mapped by the pixel map 500 and is shown as a straight line formed by active pixels at locations of the twelfth column of the pixel map 650. A simple straight white line is shown for the first image pixels that has been pixel mapped by pixel map 500 however any image that is comprised of a plurality of separate colored image pixels can have the separate colored image pixels that create the first image to deconverged to create a second image comprised of deconverged first and second separate images. The red, green and blue lines of the second image pixels as mapped by pixel map 650 were previously converged to produce the white straight line of active pixels shown pixel mapped by pixel map 500. It is also possible to deconverge the plurality of separate colored image pixels that make up a first image or a plurality of active pixels in any direction and with any amount of offset by applying a variable function to offset the plurality of separate colored image pixels by varying amounts in varying directions on the pixel map as shown by 850 of FIG. 8. The amount of offset or the direction that the separate colored images are deconverged can be generated by a random number generator. An operator of the central controller 150 of FIG. 4 may send a deconverge effects command to cause a first image stored in the memory or projected by IPLD 102 to be modified into a second image. Also the operator of the central controller may send commands to the IPLD 102 that control the direction and amount of deconvergence of the separate colors that make up the first image to create a second image.

FIG. 7 shows the same pixel map 500 that shows the first image pixels that have been pixel mapped as shown in FIG. 5. Once again the first image is comprised of a straight line of active pixels in all the rows of the ninth column and inactive pixels in all of the other columns The first image is comprised of a vertical white straight line image or a straight line of active pixels for simplification (although shown as a black line of active pixels in FIG. 7) however the first image can be any image that can be projected by the IPLD 102. A white straight line can be considered a multicolored image since a white straight line image is comprised of the multicolored pixels that comprise the separate colored images of the separate colors of red, green and blue.

Pixel map 750 shows a pixel mapped second image with a plurality of differently magnified areas as an effect has been applied to the first image shown by pixel map 500. The active pixels at locations D9 and J9 of the first image shown in pixel map 500 have been "positively" magnified and now are mapped as additional active surrounding pixels in pixel map 750 The pixel at location D9 that is an active pixel component of the first image as shown by pixel map 500, has been magnified by multiplying the pixel D9 to make it appear larger so that a first magnified area in pixel map 750 comprises active pixels C8, C9, C10, D8, D9, D10, E8, E9 and E10. The pixel at location J9 that is an active pixel component of the first image as mapped by pixel map 500, has been magnified by multiplying the pixel J9 to make it appear larger so that a second area comprised of pixels I8, I9, I10, J8, J9, J10, L8, L9, and L10 is now active in pixel map 750 The pixels at locations A9 and B9 of pixel map 750 have been magnified by one (i.e. are the same magnification) as the pixels at locations A9 and B9 in pixel map 500.

The second pixel map 750 also shows that second image pixels located at the fourth area of F9, G9 and H9 have the same magnification as the pixels located at F9, G9 and H9 of the first pixel mapped image of pixel map 500. Pixels of the second image as mapped by the pixel map 750 further show that pixels located at the fifth area of L9 and M9 have the same magnification as the pixels at locations L9 and M9 of the first image pixel map 500. The second image as mapped by the pixel map 750 shows that first image as mapped by the pixel map 500 has had its proportions varied by applying a function to the first image that creates a plurality of differently magnified areas.

The magnified areas of the pixels of the first image can be accomplished by applying a function to the first image pixels that modifies selective areas of the first image pixels. An area can be comprised of a single pixel or a plurality of pixels. Magnification of selected areas can either be positive magnifications such as a "zoom in" or negative magnifications such as a "zoom out" of the selective areas. A positive magnification can be accomplished by multiplication function while a negative magnification can be accomplished by a division function. Positively magnified pixels of the first image are shown as a greater number of pixels on the second image pixel map so that visually the area appears to be larger to the viewer. The selected areas or the first image that have the magnification applied to create the second image can reside in a look up table or can be arrived at randomly by applying random numbers that can be used in conjunction with the operating software to randomly select the areas to be magnified.

The operator of the central controller 150 of FIG. 4 may send a plurality of differently magnified areas effect command to cause a first image-stored in the memory 315 or projected by the IPLD 102 to be modified into a second image. Also the operator of the central controller 150 may send commands to the IPLD 102 that control the amount of magnification of the plurality of differently magnified areas of the first image as well as control the number of areas involved to be applied to the first image to create a second image. The second image with the plurality of differently magnified areas can visually look like water droplets over an image for example.

The first image may reside in the memory 315 of the IPLD 102. The first image or data corresponding to the first image may be sent from the central controller 150 over the communication system to be received by communications port 311. If the first image originates at the central controller 150 it is also possible to apply the modification effects of the invention to the first image by applying the appropriate function to the first image to create a second image at the central controller 150. The operator of the central controller 150 can call up the first image stored in the memory (not shown) of the central controller 150 and apply any of the image modification effects of embodiments of the present invention to create a second image by inputting to the input keyboard 154 or input devices 156. The second image then can be sent from the central controller 150 to the IPLDs 102 or 104 of FIG. 4 to be received at the communications port 311 and then projected onto the projection surface 420. United States patent application titled "METHOD AND APPARTUS FOR CONTROLLING IMAGES WITH IMAGE PROJECTION LIGHTING DEVICES", inventor Richard S. Belliveau, Ser. No. 10/206,162, filed on Jul. 26, 2002, incorporated by reference herein, describes a central controller incorporating an image editor for use with a plurality of image projection lighting devices.

FIG. 8 shows a first image that is shown pixel mapped by pixel map 800. A short straight line of active pixels is shown as active pixels 8E, 8F, 8H, 8I on the pixel map 800. The first image is a vertical white straight line image (along with the inactive pixels) for simplification however the first image can be any image that can be projected by the IPLD 102. An image can generally be considered to be comprised of both active and inactive pixels or an image could be considered to be comprised of active pixels. A white straight line can be considered a multicolored image since a white straight line is comprised of the multicolored pixels that comprise the separate colored images of the separate colors of red, green and blue images.

Pixel map 820 shows that the first image as pixel mapped by the pixel map 800 has been tiled into three tiled images. A mulitcolored tiled effect has been applied to the pixels of the first image as shown by pixel map 800 by applying a tiling function to create the three tiled images that visually looks like the first image but now there is a plurality of images resembling the first image. The first, second and third tiled images of the second image that were created from the first image shown by the image map 800 were tiled by a tiling function that was applied horizontally in relation to the first image. The pixel map 820 shows the first tiled image of the second image as pixels at locations 5E, 5F, 5G, 5H, and 5I. The pixel map 820 shows the second tiled image of the second image as pixels at locations 9E, 9F, 9G, 9H, and 9I. The pixel map 820 shows the third tiled image of the second image as pixels 11E, 11F, 11G, 11H, and 11I. The first, second and third tiled image of the second image can be visually different colors in relation to each other. When the tiling effect is applied to the first image as shown by pixel map 800, a color varying function can individually vary the color of each individual tiled images to create tiled images that are of different colors.

Pixel map 850 shows a third image where a tiling effect that creates three tiled images has been applied to the first image as shown pixel mapped by pixel map 800 except the function that applied the tiling to the first image was applied at a forty five degree angle instead of horizontally as shown in the second image as mapped by pixel map 820. The pixel map 850 shows the first tiled image of the third image as pixels located at locations I4, J4, K4, L4 and M4. The pixel map 850 shows the second tiled image of the third image as pixels located at locations E8, F8, G8, H8 and I8. The pixel map 850 shows the third tiled image of the third image as pixels located at locations A12, B12, C12, D12, and E12. The first, second and third tiled images of the third image are substantially different colors in relation to each other. For example the first tiled image of the third image can be a solid red, the second tiled image of the third image can be a solid green and the third tiled image of the third image can be a solid blue. When the tiling effect is applied to the first image as shown by pixel map 800 a color varying function can individually vary the color of each individual tiled image to create tiled images that are of different colors. The tiling effect can be applied at any angle to the first image by applying an angle to the tiling function. The tiling function angle can be variably controlled by commands received over the communication port 311 of IPLD 102. The color varying function applied individually to each of the tiles can be applied at random by using a random number generator that can be generated in operational software by the control system 327 to affect the function of each of the colors of each of the individual tiles or the color varying function routine can be preset in the memory 315 or the image control memory 312.

The pixel map 900 of FIG. 9 shows a fourth image where the tiling effect can be applied radially to the first image as shown pixel mapped by the pixel map 800. By applying the tiled images radially a kaleidoscope effect can be created. Pixel map 900 shows four tiled images. A multicolored tile effect has been applied to the pixels of the first image as shown pixel mapped by pixel map 800 by applying a function to create the four tiled images that visually look like the first image of pixel map 800 but now the there is fourth image comprising four tiled images resembling the first image. The pixel map 900 shows the first tiled image of the fourth image as pixels located at locations G4, G5, G6, G7 and G8. The pixel map 900 shows the second tiled image of the fourth image as pixels located at locations H9, I9, J9, K9, and L9. The pixel map 900 shows the third tiled image of the fourth image as pixels located at locations G10, G11, G12, G13 and G14. The pixel map 900 shows the fourth tiled image of the fourth image as pixels located at locations B9, C9, D9, E9, and F9. The first, second and third and fourth tiled images of the fourth image may be visually different colors in relation to each other. When the tiling effect is applied to the first image as shown pixel mapped by pixel map 900 a color varying function can individually vary the color of each individual tiled image to create tiled images that are of different colors. When the individual tiles are colored by the color varying function the colors for each tile is then distinct and within the boundary of each individual tile.

The functions applied to produce the effects as shown by pixel map 520, 550, 650 and 700 can be applied to a first image to produce a second image at any angle to the first image to produce the second image. The function applied to any effect can be made to be applied at any angle and the angle can be variable. By controlling the angle at which the function is applied to the first image many variations of the first image exists. It is then possible to rotate the orientation of the first image projected on the projection surface by IPLD 102 in a clockwise direction while applying a function that provides an effect such as deconverge effect to the first image and at the same time changing the angle to which the function is applied in a counterclockwise direction to the first image pixels. The variation of the angle to which the function can be applied can be sent as command signals from the central controller 150 over the communication system to be received by the communications port 311 of FIG. 3. The processor 316 may then send the appropriate control signals to the image control 312 to vary the angle to which a function is applied to the first image to create a second image. The operator of the central controller 150 may then input commands to the central controller by using an input device such as keyboard 155 or input devices 156 to vary the angle to which the function is applied to the first image to create a second image that is projected by the IPLD 102.

Any of the image modification effects of the invention can also be applied to the first image by a technician inputting to the keypad 325 of figure 3 of the IPID 102. The input keypad can send control commands to the processor 316 that can act in accordance with the operating software stored in the memory 315 to apply functions that vary the first image to create a second image.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A stage lighting apparatus comprising:
   a base;
   a yoke;
   a lamp housing;
   the lamp housing comprising
      a lamp,
      and a first light valve;
   wherein the lamp and the first light valve cooperate to project a first image and a second image;
   wherein the second image is created by applying a function to a plurality of pixels of the first image;
   wherein the plurality of pixels of the first image are arranged in a straight line;
   wherein applying the function to the plurality of pixels of the first image causes first, second, third, and fourth sets of the plurality of pixels to deviate from the straight line in first, second, third, and fourth directions, respectively;
   wherein the second set of the plurality of pixels is located in the second image between the first set and the third set;
   wherein the third set of pixels is located in the second image between the second set and the fourth set;
   and wherein the first and third directions are substantially the same, the second and fourth directions are substantially the same, and the first direction is substantially opposite the second direction.

2. The stage lighting apparatus of claim 1 wherein the function applied is a waveform.

3. The stage lighting apparatus of claim 1 wherein the lamp and the first light valve cooperate to project a third image wherein the third image is created by applying the function to a plurality of pixels of the second image.

4. The stage lighting apparatus of claim 1 further comprising
   a control system; and
   wherein the function is applied to the plurality of pixels of the first image by the control system.

5. The stage lighting apparatus of claim 4 further comprising
   a communications port; and
   wherein the communications port receives a command to cause the function to be applied to the plurality of pixels of the first image.

6. The stage lighting apparatus of claim 4 wherein the control system receives an input from a keypad to cause the function to be applied to the plurality of pixels of the first image.

7. The stage lighting apparatus of claim 1 wherein applying the function to the plurality of pixels of the first image to create the second image visually provides a liquid effect.

8. A stage lighting apparatus comprising:
   a base;
   a yoke;
   a lamp housing;
   the lamp housing comprising
      a lamp,
      and a first light valve;
   wherein the lamp and the first light valve cooperate to project a first image and a second image, wherein the second image is created by applying a waveform function to a plurality of pixels of the first image to create a liquid effect.

9. The stage lighting apparatus of claim 8 wherein the amplitude of the waveform is variable.

10. The stage lighting apparatus of claim 8 further comprising
    a control system;
    and wherein the waveform function is applied by the control system.

11. A stage lighting apparatus comprising:
    a base;
    a yoke;
    a lamp housing;
    the lamp housing comprising
       a lamp,
       and a first light valve;
    wherein the lamp and the first light valve cooperate to project a first image and a second image and wherein the second image is created by applying a function to a plurality of pixels of the first image;
    and wherein the plurality of pixels of the first image are comprised of a plurality of separate colored image pixels and the functions applied to the first plurality of pixels of the first image deconverges the plurality of separate colored image pixels of the first image to create the second image.

12. The stage lighting apparatus of claim 11 wherein each of the plurality of separate colored image pixels is comprised of a plurality of each separate colors;
    the function applied to the plurality of pixels of the first image is variable;
    and the function causes an amount of deconvergence of the plurality of separate colors of each of the plurality of separate colored image pixels of the first image;
    and the amount of deconvergence of the plurality of separate colors of each of the plurality of pixels of the first image can be varied.

13. The stage lighting apparatus of claim 11 further comprising
    a control system;
    and wherein the control system causes the function to be applied to the plurality of pixels of the first image.

14. The stage lighting apparatus of claim 13 further comprising
    a communications port;
    and wherein the communications port receives a command which causes the functions to be applied to the plurality of pixels of the first image.

15. The stage lighting apparatus of claim 13 wherein the control system receives an input from a keypad which causes the function to be applied to the plurality of pixels of the first image.

16. The stage lighting apparatus of claim 11 wherein applying the function to the plurality of pixels of the first image to create the second image visually provides a deconverged effect.

17. A stage lighting apparatus comprising:
a base;
a yoke;
a lamp housing;
  the lamp housing comprising
  a lamp;
  and a first light valve;
  wherein the lamp and the first light valve cooperate to project a first image and a second image and wherein the second image is created by applying a function to a plurality of pixels of the first image;
wherein the first image is comprised of a plurality of areas including:
  a first area having a first set of the plurality of pixels;
  a second area having a second set of the plurality of pixels;
  a third area having a third set of the plurality of pixels; and
  one or more further areas having one or more further sets of the plurality of pixels;
and wherein the second image is comprised of a plurality of magnified areas including:
a first magnified area which is the first area of the image magnified by a first magnification;
a second magnified area which is the second area of the first image magnified by a second magnification;
a third magnified area which is the third area of the first image magnified by a third magnification; and
one or more further magnified areas which are one or more further areas, respectively, of the first image, magnified by one or more further magnifications, respectively;
wherein any of the one or more further magnifications of any of the one or more further magnified areas which are adjacent to any of the first, second, or third magnified areas are substantially different from the first, second, or third magnifications;
and wherein none of the first, second or third magnified areas are adjacent to each other.

18. The stage lighting apparatus of claim 17 wherein the function applied is a multiplication or a division.

19. The stage lighting apparatus of claim 17 further comprising
a control system;
and wherein the function is applied to the plurality of pixels that comprise the first image by the control system.

20. The stage lighting apparatus of claim 19 further comprising
a communications port; and
wherein the communications port receives a command which causes the function to be applied to the plurality of pixels that comprise the first image.

21. The stage lighting apparatus of claim 20 wherein the control system receives an input from a keypad to cause the function to be applied to the plurality of pixels that comprise the first image.

22. The stage lighting apparatus of claim 20 wherein the first, second, third, and fourth areas are selected randomly.

23. A stage lighting system comprising:
a first stage lighting apparatus comprising
  a first base;
  a first yoke;
  a first lamp housing;
  the first lamp housing comprising
    a first lamp
    and a first light valve;
wherein the first lamp and the first light valve cooperate to project a first image and a second image and wherein the second image is created by applying a first function to a plurality of pixels of the first image;
wherein the plurality of pixels of the first image are arranged in a first straight line;
wherein applying the function to the plurality of pixels of the first image causes first second, third, and fourth sets of the plurality of pixels of the first image to deviate from the straight line in first, second, third, and fourth directions, respectively; and
wherein the second set of the plurality of pixels is located in the second image between the first set and the third set;
wherein the third set of the plurality of pixels is located in the second image between the second set and the fourth set;
and wherein the first and third directions are substantially the same, the second and fourth directions are substantially the same, and the first direction is substantially opposite the second direction;
and further comprising
a second stage lighting apparatus comprising
a second base;
a second yoke;
a second lamp housing;
the second lamp housing comprising
  the second lamp; and a second light valve;
wherein the second lamp and the second light valve cooperate to project a third image and a fourth image and the fourth image is created by applying a second function to a plurality of pixels of a third image;
wherein the plurality of pixels of the third image are arranged in a second straight line;
wherein applying the second function to the plurality of pixels of the third image causes fifth, sixth, seventh, and eighth sets of the plurality of pixels of the third image to deviate from the second straight line in fifth, sixth, seventh, and eighth directions, respectively; and
wherein the sixth set of the plurality of pixels is located in the fourth image between the fifth set and the seventh set;
wherein the seventh set of the plurality of pixels is located in the fourth image between the sixth set and the eighth set;
and wherein the fifth and seventh directions are substantially the same, the sixth and eighth directions are substantially the same, and the fifth direction is substantially opposite the sixth direction.

24. The stage lighting system of claim 23 further comprising:
a central controller; and a
a communications system;
wherein the first stage lighting apparatus further comprises a communications port;

and wherein a command sent from the central controller over the communications system to the communications port of the first stage lighting apparatus causes the first function to be applied to the plurality of pixels of the first image.

25. The stage lighting system of claim 24 further comprising:
wherein the second stage lighting apparatus further comprises a communications port;
and wherein a command sent from the central controller over the communications system tho the communications port of the second stage lighting apparatus causes the second function to be applied to the plurality of pixels of the third image.

26. A stage lighting system comprising:
a first stage lighting apparatus comprising
a first base;
a first yoke;
a first lamp housing;
the first lamp housing comprising
a first lamp;
and a first light valve;
wherein the first lamp and the first light valve cooperate to project a first image and a second image and wherein the second image is created by applying a first function to a plurality of pixels of a first image;
and wherein each of the plurality of pixels of the first image is comprised of a plurality of separate colored image pixels and the first function applied to the plurality of pixels of the first image deconverges the plurality of separate colored image pixels of the first image to create the second image;
and further comprising
a second stage lighting apparatus comprising
a second base;
a second yoke;
a second lamp housing;
the second lamp housing comprising
a second lamp,
and a second light valve;
wherein the second lamp and the second light valve cooperate to project a third image and a fourth image and wherein the fourth image is created by applying a second function to a plurality of pixels of the third image;
and wherein each of the plurality of pixels of the third image is comprised of a plurality of separate colored image pixels and the second function applied to the plurality of pixels of the third image deconverges the plurality of separate colored image pixels of the third image to create the fourth image.

27. The stage lighting system of claim 26 further comprising:
a central controller; and
a communications system;
wherein the first stage lighting apparatus further comprises a communications port;
and wherein a command sent from the central controller over the communications system to the communications port of the first stage lighting apparatus causes the first function to be applied to the plurality of pixels of the first image.

28. The stage lighting system of claim 27 wherein
wherein the second stage lighting apparatus further comprises a communications port;
and wherein a command sent from the central controller over the communications system to the communications port of the second stage lighting device cause the second function to be applied to the plurality of pixels of the third image.

29. A stage lighting system comprising:
a first stage lighting apparatus comprising
a first base;
a first yoke;
a first lamp housing;
the first lamp housing comprising
a first lamp,
and a first light valve;
wherein the first lamp and the first light valve cooperate to project a first image and a second image and wherein the second image is created by applying a function to a plurality of pixels of the first image;
wherein the first image is comprised of a plurality of areas including:
a first area having a first set of the plurality of pixels;
a second area having a second set of the plurality of pixels;
a third area having a third set of the plurality of pixels; and
one or more further areas having one or more further sets of the plurality of pixels;
and wherein the second image is comprised of a plurality of magnified area including:
a first magnified area which is the first area of the image magnified by a first magnification;
a second magnified area which is the second area of the first image magnified by a second magnification;
a third magnified area which is the third area of the first image magnified by a third magnification; and
one or more further magnified areas which are one or more further areas, respectively, of the first image, magnified by one or more further magnifications, respectively;
wherein any of the one or more further magnifications of any of the one or more further magnified areas which are adjacent to any of the first, second, or third magnified areas are substantially different from the first, second, or third magnifications;
and wherein none of the first, second or third magnified areas are adjacent to each other
and further comprising
a second stage lighting apparatus comprising
a second base;
a second yoke;
a second lamp housing;
the second lamp housing comprising
a second lamp,
and a second light valve;
wherein the second lamp and the second light valve cooperate to project a third and a fourth image and the fourth image is created by applying a second function to a plurality of pixels of the third image; and
wherein the third image is comprised of a plurality of areas including:
a fourth area having a first set of the plurality of pixels;
a fifth area having a second set of the plurality of pixels;

a sixth area having a third set of the plurality of pixels; and one or more further areas having one or more further sets of the plurality of pixels;

and wherein the fourth image is comprised of a plurality of magnified areas including:

a fourth magnified area which is the fourth area of the third image magnified by a fourth magnification;

a fifth magnified area which is the fifth area of the third image magnified by a fifth magnification;

a sixth magnified area which is the sixth area of the third image magnified by a sixth magnification; and one or more further magnified areas of the fourth image which are one or more further areas, respectively, of the third image, magnified by one or more further magnifications, respectively;

wherein any of the one or more further magnifications of any of the one or more further magnified areas of the fourth image which are adjacent to any of the fourth, fifth, or sixth magnified areas are substantially different from the fourth, fifth, or sixth magnifications;

and wherein none of the fourth, fifth or sixth magnified areas are adjacent to each other.

30. The stage lighting system of claim 29 further comprising:

a central controller;

a communications system;

and wherein the first stage lighting apparatus further comprises a communications port;

and wherein a command sent from the central controller over the communications system to the communications port of the first stage lighting apparatus causes the first function to be applied to the plurality of pixels of the first image.

31. The stage lighting system of claim 30 wherein:

the second stage lighting apparatus further comprises a communications port;

and wherein a command sent from the central controller over the communication system to the communications port of the second stage lighting apparatus causes the second function to be applied to the plurality of pixels of the third image.

32. A method comprising:

projecting a first image comprised of a plurality of pixels; and applying a first function to the plurality of pixels of the first image to create a second image; and projecting the second image;

wherein the plurality of pixels of the first image are arranged in a straight line;

wherein applying the first function to the plurality of pixels of the first image causes first, second, third, and fourth sets of the plurality of pixels to deviate from the straight line in first, second, third, and fourth directions, respectively; and wherein the second set of the plurality of pixels is located in the second image between the first set and the third set;

wherein the third set of pixels is located in the second image between the second set and the fourth set;

and wherein the first and third directions are substantially the same, the second and fourth directions are substantially the same, and the first direction is substantially opposite the third direction.

33. The method of claim 32 wherein the first function is a waveform.

34. The method of claim 32 further comprising wherein the second image is comprised of a plurality of pixels and further comprising applying a second function to the plurality of pixels of the second image to create a third image; and projecting the third image.

35. The method of claim 32 further comprising receiving a command to cause the first function to be applied to the plurality of pixels of the first image.

36. The method of claim 32 further comprising receiving an input from a keypad to cause the first function to be applied to the plurality of pixels of the first image.

37. The method of claim 32 further comprising applying the first function to the plurality of pixels of the first image to create the second image visually provides a liquid effect.

38. A method comprising projecting a first image comprised of plurality of pixels;

applying a waveform function to the plurality of pixels of the first image to create and second image; and projecting the second image wherein applying the waveform function to the plurality of pixels of the first image to create the second image visually provides a liquid effect.

39. A method comprising projecting a first image comprised of a plurality of pixels;

applying a function to the plurality of pixels of the first image to create a second image;

and projecting the second image;

and wherein each of the plurality of pixels of the first image is comprised of a plurality of separate colors and the functions applied to the plurality of pixels of the first image deconverges the plurality of separate colors of each of the plurality of pixels of the first image to create the second image.

40. The method of claim 39 wherein the function applied to the plurality of pixels of the first image is variable;

the function causes an amount of deconvergence of the plurality of separate colors of each of the plurality of pixels of the first image;

and the amount of deconvergence of the plurality of separate colors of each of the plurality of pixels of the first image can be varied.

41. The method of claim 39 further comprising receiving a command, which causes the function to be applied to the plurality of pixels of the first image.

42. The method of claim 39 further comprising receiving an input from a keypad, which causes the function to be applied to the plurality of pixels of the first image.

43. The method of claim 39 wherein applying the function to the plurality of pixels of the first image to create the second image visually provides a deconverged effect.

44. A method comprising the steps of projecting a first image comprised of a plurality of pixels;

applying a function to the plurality of pixels of the first image to create a second image; and projecting the second image;

wherein the first image is comprised of a plurality of areas including:
  a first area having a first set of the plurality of pixels;
  a second area having a second set of the plurality of pixels;
  a third area having a third set of the plurality of pixels; and
  one or more further areas having one or more further sets of the plurality of pixels;
  and wherein the second image is comprised of a plurality of magnified areas including:
  a first magnified area which is the first area of the image magnified by a first magnification;
  a second magnified area which is the second area of the first image magnified by a second magnification;
  a third magnified area which is the third area of the first image magnified by a third magnification, and
  one or more further magnified areas which are one or more further areas, respectively, of the first image, magnified by one or more further magnifications, respectively;
  wherein any of the one or more further magnifications of any of the one or more further magnified areas which are adjacent to any of the first, second, or third magnified areas are substantially different from the first, second, or third magnifications;
  and wherein none of the first, second or third magnified areas are adjacent to each other.

45. The method of claim 44 wherein the function applied is a multiplication or a division.

46. The method of claim 44 further comprising receiving a command, which causes the function to be applied to the plurality of pixels of the first image.

47. The method of claim 44 further comprising receiving an input from a keypad to causes the function to be applied to the plurality of pixels of the first image.

48. The method of claim 44 wherein the first, second, third, and fourth areas are selected randomly.

49. A stage lighting apparatus comprising:
a base;
a yoke;
a lamp housing;
the lamp housing comprising
  a lamp,
  and a first light valve;
wherein the lamp and the first light valve cooperate to project a first image, a second image and a third image;
wherein the second image is created by applying a function to the first image. wherein the function proportionately varies the first image, and the third image is created by applying the function to the second image, wherein the function proportionately varies the second image;
wherein the function is applied to the first image at a first angle to create the second image;
and wherein the function is applied to the second image at a second angle to create the third image
and the first, second, and third images visually appear different proportionately.

50. The stage lighting apparatus of claim 49 further comprising
a control system; and
wherein the function is applied to the first image at the first angle by the control system.

51. The stage lighting apparatus of claim 49 further comprising
a communication port; and
wherein the communications port receives a first command to cause the function to be applied at the first angle and the communications port receives a second command to cause the function to be applied at a the second angle.

52. The stage lighting apparatus of claim 49 wherein the control system receives an input from a keypad to cause the function to be applied at the first angle to the first image and the communications port receives a second command to cause the function to be applied at the second angle.

53. The stage lighting apparatus of claim 50 wherein the function applied visually provides a liquid effect.

54. The stage lighting apparatus of claim 49 wherein the function applied visually provides a plurality a differently magnified areas effect.

55. A stage lighting apparatus comprising:
a base;
a yoke;
a lamp housing;
the lamp housing comprising
  a lamp,
  and a first light valve;
wherein the lamp and the first light valve cooperate to project a first image, a second image and a third image;
wherein the second image and the third image are created by applying a function to the first image that deconverges the separate colored images that comprise the first image;
and wherein the first image, the second image and the third image are visibly different.

56. The stage lighting apparatus of claim 55 further comprising a communications port wherein:
the differences between the second image and the third image can be controlled by command signals received at the communications port.

57. The stage lighting apparatus of claim 55 further comprising a communications port wherein;
the differences between the second image and the third image are controlled by a random number generator.

58. A stage lighting apparatus comprising:
a base;
a yoke;
a lamp housing;
the lamp housing comprising
  a lamp,
  and a first light valve;
wherein the lamp and the first light valve cooperate to project a first image and a second image;
and wherein the first image and the second image are multicolored images;
and the second image is created by applying a tiling function to the first image that tiles the first image into a plurality of tiled images;
and the second image is also created by applying a color varying function individually to a first, second and third tiled image of the plurality of tiled images;
and wherein the first, second and third filed images are substantially different in color.

59. The stage lighting apparatus of claim 58 wherein
the first tiled image has a solid red color, the second tiled image has a solid green color, and the third tiled image has a solid blue color.

60. The stage lighting apparatus of claim 58 further comprising
a control system; and
wherein the color varying function is applied to the first image by the control system.

61. The stage lighting apparatus of claim 58 further comprising
a communications port; and
wherein the communications port receives a command to cause the color varying function to be applied to the plurality of pixels of the first image.

62. The stage lighting apparatus of claim 60 wherein
the control system receives an input from a keypad to cause the color varying function to be applied to the first image.

63. The stage lighting apparatus of claim 58 wherein
the color varying function is applied randomly.

64. The stage lighting apparatus of claim 58 wherein
the color varying function is preset in a memory.

65. The stage lighting apparatus of claim 60 wherein
applying the color varying function to the first, second, and third tiled images of the plurality of tiled images, visually provides an individually variably colored tiling effect.

66. A stage lighting apparatus comprising:
a base;
a yoke;
a lamp housing;
the lamp housing comprising
a lamp,
and a first light valve;
a communications port for receiving command signals:
wherein the lamp and the first light valve cooperate to project a first image and a second image;
and the second image is created from the first image by applying a tiling function to the first image that tiles the first image into a plurality of tiled images, which are radially transposed to each other.

67. The stage lighting apparatus of claim 66 further comprising
a control system, and
wherein the function is applied to the first image by the control system.

68. The stage lighting apparatus of claim 66 further comprising
a communications port; and
wherein the communications port receives a command to cause the function to be applied to the first image.

69. The stage lighting apparatus of claim 67 wherein
the control system receives an input from a keypad to cause the function to be applied to the first image.

70. The stage lighting apparatus of claim 66 wherein
applying to the function to the plurality of tiled images visually provides a kaleidoscope effect.

71. A stage lighting apparatus comprising:
a base;
a yoke;
a lamp housing;
a control system;
the lamp housing comprising
a lamp,
and a first light valve;
wherein the lamp and the first light valve cooperate to project a first image and a second image;
and wherein a liquid effect is applied to the first image by the control system to create the second image that visually imparts a liquid effect.

72. A stage lighting apparatus comprising:
a base;
a yoke;
a lamp housing;
a control system;
the lamp housing comprising
a lamp,
and a first light valve;
wherein the lamp and the first light valve cooperate to project a first image and a second image;
and wherein a deconverge effect is applied to the first image by the control system to create the second image that visually imparts a deconverged effect.

73. A stage lighting apparatus comprising:
a base;
a yoke;
a lamp housing;
a control system;
the lamp housing comprising
a lamp,
and a first light valve;
wherein the lamp and the first light valve cooperate to project a first image and a second image;
and wherein a plurality of differently magnified areas effect is applied to the first image by the control system to create the second image that visually imparts a plurality of differently magnified areas.

74. A stage lighting apparatus comprising:
a base;
a yoke;
a lamp housing;
a control system;
the lamp housing comprising
a lamp,
and a first light valve;
wherein the lamp and the first light valve cooperate to project a first image and a second image:
and wherein a tiling effect is applied to the first image by the control system to create the second image with a plurality of tiles each resembling the first image and a color varying effect is also applied by the control system to independently vary the color of the plurality of tiles.

75. A stage lighting apparatus comprising:
a base;
a yoke;
a lamp housing;
a control system;
the lamp housing comprising
a lamp,
and a first light valve;
wherein the lamp and the first light valve cooperate to project a first image and a second image;
and wherein a kaleidoscope effect is applied to the first image by the control system to create the second image that visually imparts a kaleidoscope effect.

76. A stage lighting apparatus comprising:
a base;
a yoke;
a lamp housing;
a control system;
the lamp housing comprising
   a lamp,
   and a first light valve;
wherein the lamp and the first light valve cooperate to project a first image and a second image and
wherein the second image is created from the first image by the control system
   wherein the first image is comprised of:
   a first area having a first set of a plurality of pixels;
   a second area having, a second set of the plurality of pixels; and
   a third area having a third set of the plurality of pixels;
   and wherein the second image is comprised of:
      a first magnified area which is the first area of the image magnified by a first magnification;
      a second magnified area which is the second area of the first image magnified by a second magnification; and
      a third magnified area which is the third area of the first image magnified by a third magnification;
and wherein the first, second and third magnifications areas substantially different.

77. A stage lighting apparatus comprising:
a base;
a yoke;
a lamp housing;
a control system;
the lamp housing comprising
   a lamp,
   and a first light valve;
wherein the lamp and the first light valve cooperate to project a first image and a second image and
wherein the second image is created from the first image by the control system
and wherein the control system creates the second image from the first image by applying a waveform function to the first image and
wherein the second image visually imparts to an audience viewing the projected second image that the first image is flowing in liquid form.

78. A stage lighting apparatus comprising:
a base;
a yoke;
a lamp housing;
the lamp housing comprising
   a lamp,
   and a first light valve;
wherein the lamp and the first valve cooperate to project a first image and a second image;
and wherein the second image is created by applying a color varying function to the first image and
wherein the color varying function is applied at random as specified by a random number generator.

79. A stage lighting apparatus of claim 78 further comprising
a control system;
and wherein the control system applies the color varying function to the first image to create the second image.

* * * * *